March 31, 1953 P. M. COOPER 2,633,302
RAIL JOINT

Filed Nov. 3, 1948 2 SHEETS—SHEET 1

Inventor,
Pershing M. Cooper,

By Stone, Boyden & Mack.
ATTORNEYS.

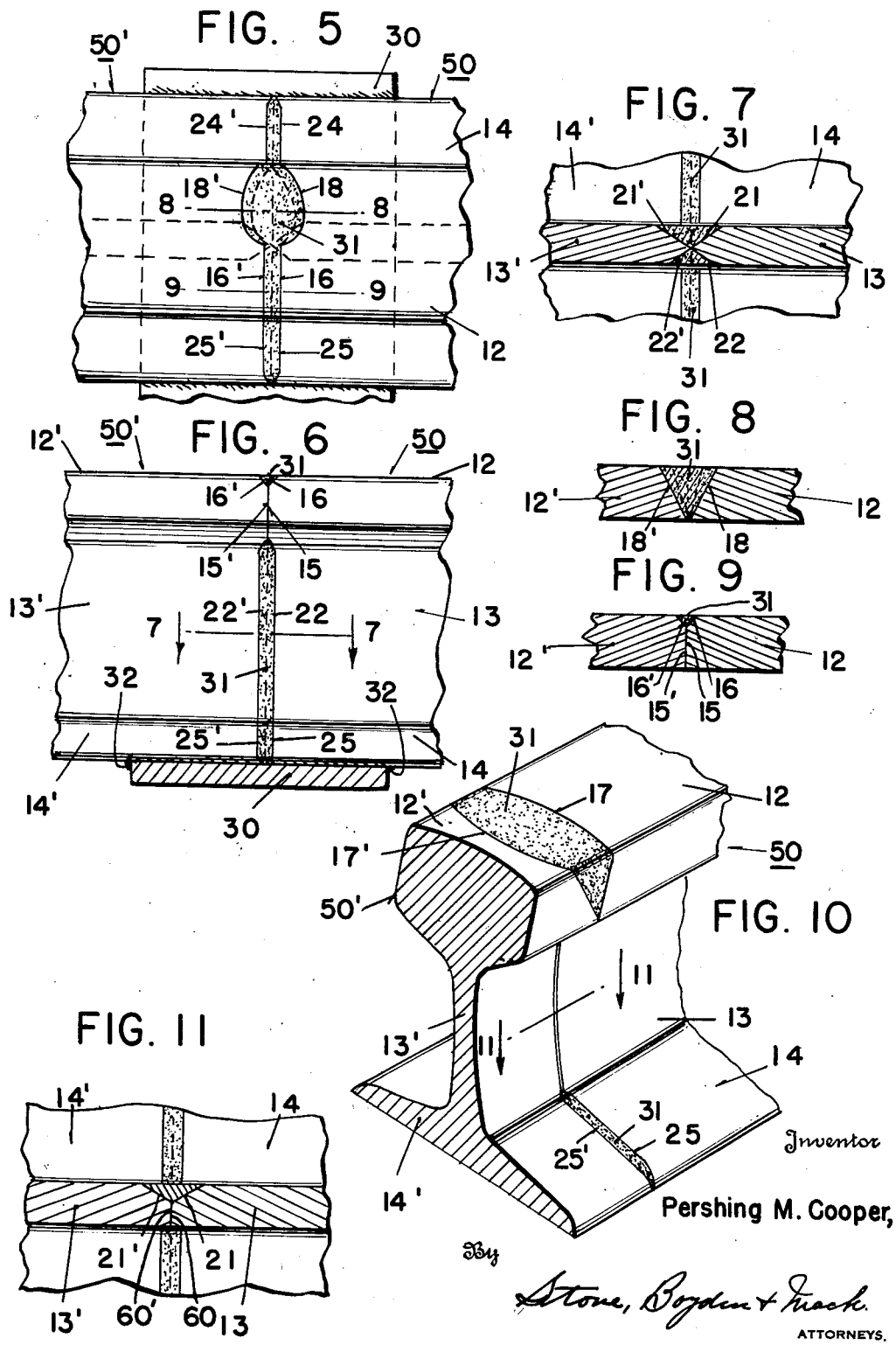

Patented Mar. 31, 1953

2,633,302

UNITED STATES PATENT OFFICE 2,633,302

RAIL JOINT

Pershing M. Cooper, Helen, W. Va.

Application November 3, 1948, Serial No. 58,098

13 Claims. (Cl. 238—164)

This invention relates to an improvement in railroad track and rails, and more specifically to an improved shape for the end surfaces of rails which are to be joined by deposited weld metal.

Prior forms of rails for welded joints have been designed with the idea in mind of providing a construction which would increase the area of the rail end which is in contact with the deposited weld metal. For this purpose the ends of the rails have been bevelled in various panes and combinations of planes in an attempt to increase the physical strength of the resulting welded joint.

However, strength alone, while it may be of paramount consideration with respect to non-electrically powered transportation systems, is not the only criterion when considering the making of joints between rails which are used to carry electrical power of low voltage and high amperage as is the case with electric traction railroads.

In conventional practice where the rails are bolted together at the joints, it has previously been considered satisfactory to take care of electrical currents by means of conducting members of heavy wire, the ends of which are attached to the respective ends of the rails so that the wire conductor forms an electrical by-pass around the bolted joint which, in itself is a poor electrical conductor and, in the case of currents of high amperage, introduces excessive losses of electrical power.

In the case of welded joints in prior use, it has been customary to use weld metal in the joint which, while it provides strength, is a sufficiently poor conductor of electricity to introduce undesirable electrical power losses.

In my improved form of welded rail joint I have eliminated the necessity for providing an electrical by-pass for rail joints, and I have provided a joint which possesses both the necessary strength to withstand the shocks occasioned by the passage of heavy rolling-stock over the rails, and does not introduce excessive electrical resistance into the circuit which supplies the motive power.

To accomplish this result I have made provision for the use of a plurality of types of weld metal in the joint where the rail ends come together. One of these weld metals may be the usual ferrous metal commonly used in the welding of steel objects. Another of the weld metals may have good qualities of electrical conductivity, compared to conventional weld metals, such as many non-ferrous metals and combinations of such metals, as, for example, brass.

Furthermore, in the use of my invention it may be desirable to employ a metal base plate which may extend under a portion of the ends of adjacent rails and to which the rails may be welded, using conventional processes for the purpose of giving strength to the joint. In connection with the use of a base plate, portions of the joint faces upon the plate may be joined by deposited weld metal having good electrical conductivity.

An additional feature of my invention takes cognizance of the fact that weld metals having good electrical conductivity are, for the most part, softer and less resistant to wear than are conventional weld metals. In view of this fact, I have designed the opposing faces of the rail ends so that where the rail is most subject to shock from rolling stock there is a minimum amount of weld metal employed, while the preponderant proportions of weld metal are used where the effects of shock are least effective.

With these and other objects in view, my invention consists in certain novel features of construction and combinations and arrangements of parts as will be more fully hereinafter described and pointed out in the claims.

In the accompanying drawings:

Fig. 5 is a plan view of a welded joint showing two rail ends prepared as shown in Fig. 2 and placed end-to-end in alignment.

Fig. 6 is an elevation of the rail joint shown in Fig. 5 viewed from the inner side of the rail.

Fig. 7 is a cross-section taken along the line 7—7 of Fig. 6.

Fig. 8 is a cross-section taken along the line 8—8 of Fig. 5.

Fig. 9 is a cross-section taken along the line 9—9 of Fig. 5.

Fig. 10 is a perspective view of a welded joint between rails placed end-to-end in alignment in which the opposing end faces have been prepared in accordance with the modification shown in Fig. 4.

Fig. 11 is a cross-section taken along the line 11—11 of Fig. 10.

Figure 1:
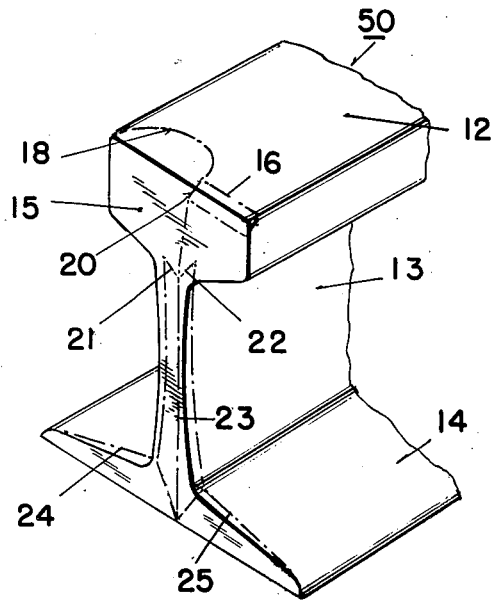
Fig. 1 is a perspective view of a conventional rail end with broken lines showing where metal is to be taken out in the accomplishment of my invention.
Figure 2:
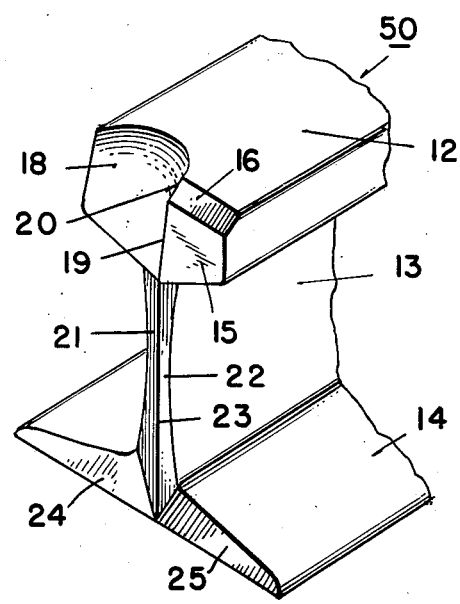
Fig. 2 is a perspective view of a rail end constructed in accordance with the teachings of my invention.

Referring to the drawings in detail, in which the rails are indicated genereally by the reference numeral 50, the preferred embodiment of the invention when used with rails is shown in Fig. 2. The conventional rail in use today is provided with a head, indicated generally at 12, a web, indicated generally at 13, and a base indicated generally by the numeral 14, and the ends of the rails are conventionally finished with a flat surface 15 which extends vertically through the head, web, and base in a plane perpendicular to the length of the rail, as indicated by the solid lines in Figs. 1 and 3. Preferably the rail is so laid as to locate the side with the least steel removed on the inside of the track so that the weight of the wheel and the impact of the wheel flange is on the inside of the rail.

As shown in the embodiment of Fig. 2, the vertical end surface 15 is retained to form a portion of the end face of the head 12. However, a forwardly and downwardly inclined bevel 16 is formed to extend from the vertical surface 15 to the top surface of the head 12. Over the outer face of the head 12 metal is also taken away so as to provide a curved surface 18 which is generally downwardly and forwardly inclined to present a substantially concave appearance. The inner end of the concave surface merges with the bevel 16 and the vertical surface 15 forming a margin 19. The margin 19 need not necessarily be vertically disposed and preferably will extend in a direction downwardly and toward the the outside of the rail while lying over its entire length on the inside of a vertical plane passing through the longitudinal axis of the rail.

In addition, both sides of the web 13 are provided with forwardly and inwardly inclined bevels, the bevel on one side being shown at 21 and the bevel on the opposite side at 22, meeting in a substantially vertical margin 23 which at its upper end joins with the margin 19 and also lies over its entire length on the inside of a vertical plane passing through the longitudinal axis of the rail. The web 14 of the rail is also provided on opposite sides of the web 13 with forwardly and downwardly inclined bevels 24 and 25.

A preferred form of welded joint for rails of this construction is shown in Figs. 5 through 9 in which there are shown the ends of two rails 50 and 50' placed end-to-end in alignment. Because the opposing faces of the rail ends must lie in a matched relationship to each other, concavities being opposite concavities, the horizontal disposition of the elements of the surface provided on rail 50' must be the reverse of the disposition of elements on rail 50 although they are similar in other respects. For convenience, elements on rail 50' which are similar to elements on rail 50 have been indicated by identical reference numerals with the addition of a prime (').

In order to give the joint a firm foundation a base plate 30, underlying the two ends of adjacent rails, may be employed and this plate may be joined to the underside of the rail bases 14 and 14' by means of weld metal 32, (Fig. 6), which may be of any conventional ferrous composition suitable for the rails employed. The space between the opposing faces of the head 12, web 13 and base 14 is also filled with deposited weld metal 31, and this portion of the joint may employ the same type of weld metal as at 32. However, where the electrical resistance of the joint is to be reduced to a minimum it is preferable to employ at 31 a weld metal of good electrical conductivity such as brass, or other suitable weld metal. Furthermore, certain portions only may be filled with brass, while the remaining portions of the joint may be filled with conventional ferrous metal.

The virtue of the joint just described is that by using a weld metal having good electrical characteristics to make a portion, or portions, of the joint, the electrical conductivity is enhanced without the necessity for additional means to carry the current. At the same time, recognizing the fact that brass is relatively a softer material than steel, the preponderant amount of it has been employed in the portion of rail joint bounded by the curved surfaces 18 and 18' which lie in the outer side of the rail heads 12 and 12' and is not subject to direct shock from the wheels of rolling stock, which shock is taken by the inner sides of the heads in line with the surfaces 15 and the forwardmost portions of the rail ends where the amount of soft weld metal exposed to this action is relatively minor, being bounded by the narrow space within the bevels 16 and 16'.

Figure 3:
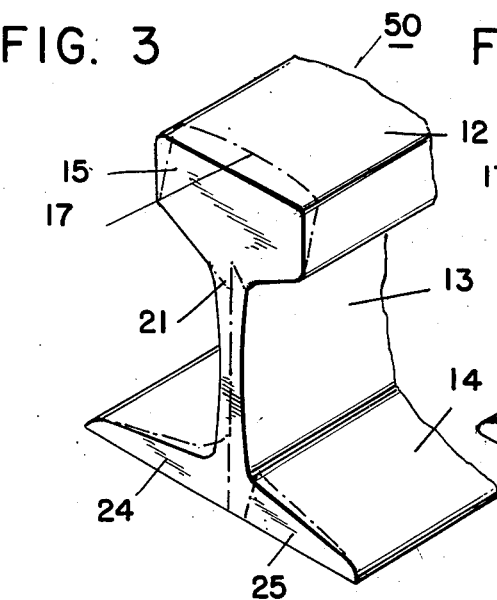
Fig. 3 is a perspective view of a conventional rail with broken lines showing where metal is to be taken out in the accomplishment of a modified form of my invention.
Figure 4:
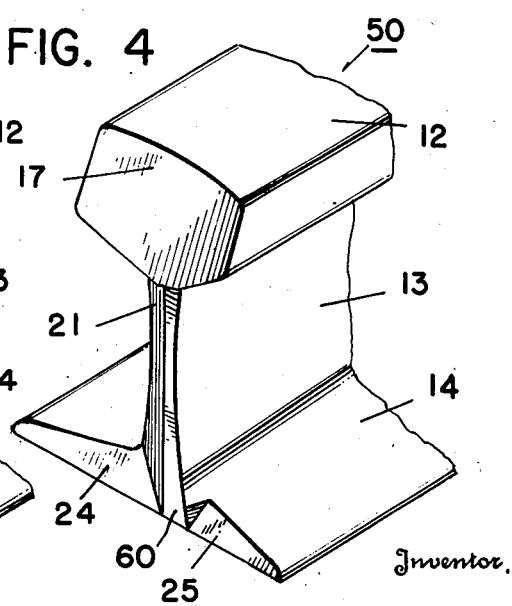
Fig. 4 is a perspective view of a modified form of rail end similar to the construction indicated in Fig. 3.

The construction of a modified form of rail end is shown in Figs. 3 and 4, while a rail joint employing the modified form is shown in Figs. 10 and 11. Where light rails are used and the loads are not heavy this type of construction will prove satisfactory. Instead of the curved surface 18 which is limited to only a portion of the face of the head 12, it extends over its entire width, as at 17, and presents to the eye a substantially downwardly and forwardly inclined concave shape. While the surface 17 is preferably symmetrically disposed across the face of the head, as would be the case if it were a true surface of revolution whose axis lay in the longitudinal vertical plane of the rail, it may be a surface of revolution whose axis is eccentric with respect to such a plane, and need not necessarily be a true surface of revolution. These remarks apply equally well to the curved surface employed in the embodiment of the invention shown in Figs. 1, 2, 5 through 9.

The web 13 of the modified rail end of Figs. 3, 4, 10 and 11 is provided with a forwardly and inwardly inclined bevel 21 only on one of its sides, while the base is provided with downwardly and forwardly extending bevels 24 and 25 as before. The remaining portion of the web at the end of the rail, is flat vertical and at right angles to the length of the rail, as shown in Fig. 11, at 60. In the rail joint shown in Figs. 10 and 11 the rails 50 and 50' are disposed end-to-end in alignment with opposing complementary surfaces being joined together by deposited weld metal 31, which in this case may consist of conventional ferrous composition, if a good electrical connection is not desired, or portions of the opposing surfaces may be joined by weld metal such as brass, or the entire joint may be filled in with non-ferrous electrically conductive metal composition.

I claim:

1. A welded rail joint comprising two steel rails disposed end-to-end in alignment, each rail having a head, a web, and a base, at least a portion of the opposing faces of the heads of adjacent rail ends being shaped to present downwardly and forwardly converging concave surfaces, the concavities on the adjacent rail ends being opposite each other, and another portion of the same faces of the same heads of the same opposed rail ends being vertically disposed, a base plate underlying the two bases and joined to said bases by deposited ferrous weld metal to give the joint strength, the opposing faces of the heads, webs, and bases being joined by deposited non-ferrous weld metal having good electrical conductivity.

2. A welded rail joint comprising two steel rails disposed end-to-end in alignment, each rail having a head, a web, and a base, at least a portion of the opposing faces of the heads of adjacent rail ends being shaped to present downwardly converging concave surfaces, the concavities on the adjacent rail ends being opposite each other, and another portion of the same faces of the same heads of the same opposed rail ends being vertically disposed, one side of each of the webs being provided with a vertically extending bevel, the bevels on adjacent rail ends being on the same side of the two rails the margins of said bevels nearest to the rear end lying to one side of the vertical center line of the webs, the spaces between said concave surfaces, bevels, and bases being filled with deposited weld metal.

3. A welding rail joint of the character described in claim 2 which includes a base plate underlying the bases of the two rails joined to said bases by deposited weld metal.

4. A steel rail end for a welded joint having a head, a web, and a base, a first portion of one end face of the head being vertically disposed, a forwardly and downwardly inclined bevel extending between the top surface of the head and said vertical face portion, the forward face of the head laterally of said first portion presenting a downwardly and forwardly inclined concave surface.

5. A steel rail end for a welded joint having a head, a web, and a base, a first portion of one end face of the head being vertically disposed, a first forwardly and downwardly inclined bevel extending between the top surface of the head and said vertical face portion, the forward face of the head laterally of said first portion presenting a downwardly and forwardly inclined concave surface, one side of the web being formed with a second and forwardly and inwardly inclined bevel, the forward vertical margin of said first bevel joining the margin of the concave surface.

6. A steel rail end for a welded joint having a head, a web, and a base, a first portion of one end face of the head being vertically disposed, a forwardly and downwardly inclined bevel extending between the top surface of the head and said vertical face portion, the forward face of the head laterally of said first portion presenting a downwardly and forwardly inclined concave surface, the sides of the web being formed with forwardly and inwardly inclined bevels, the forward margin between said bevels on the web lying to one side of the center of the web.

7. A welded rail joint comprising two steel rails disposed end-to-end in alignment, each rail having a face at each end and a base, at least a portion of the opposing faces of adjacent rail ends being shaped to present downwardly and forwardly converging concave surfaces, the concavities on the adjacent rail ends being opposite each other, a base plate underlying the two bases and joined to said bases by deposited ferrous weld metal to give the joint strength, the opposing faces of the rail ends having deposited between them non-ferrous weld metal of good electrical conductivity.

8. A steel rail end for a welded joint having a head, a web, and a base, said head having a forwardly and downwardly inclined concave surface extending across the entire width of the face.

9. A steel rail end for a welded joint having a head, a web, and a base, said head having a forwardly and downwardly inclined concave surface extending across the entire width of the face, one side of said web having a forwardly and inwardly inclined bevel.

10. A steel rail end for a welded joint having a head, a web, and a base, a first portion of one end face of the head being vertically disposed, a forwardly and downwardly inclined bevel extending between the top surface of the head and said vertical face portion, the forward face of the head laterally of said first portion presenting a downwardly and forwardly inclined concave surface, the sides of the web being formed with forwardly and inwardly inclined bevels, the forward margin between said bevels on the web lying to one side of the center of the web and joining with the inner marging of the concave surface.

11. A welded rail joint comprising two steel rails disposed end-to-end in alignment, each rail having a head, a web, and a base, a portion of the opposing end faces of the heads being vertically disposed, forwardly and downwardly inclined bevels extending between the top surfaces of the heads and said vertical face portions, the end faces of the heads presenting downwardly and forwardly inclined concave surfaces, the concavities on the adjacent rail ends being opposite each other, a base plate underlying the two bases and joined to said bases by deposited ferrous weld metal, at least a portion of the joint above said base plate comprising deposited non-ferrous weld metal of good electrical conductivity.

12. A welded rail joint comprising two steel rails disposed end-to-end in alignment, each rail having a head, a web, and a base, a portion of the opposing end faces of the heads being vertically disposed, forwardly and downwardly inclined bevels extending between the top surfaces of the heads and said vertical face portions, the end faces of the heads presenting downwardly and forwardly inclined concave surfaces, the concavities on the adjacent rail ends being opposite each other the sides of the webs being provided with forwardly and inwardly inclined bevels, a base plate underlying the two bases and joined to said bases by deposited ferrous weld metal, at least a portion of the joint above said base plate comprising deposited non-ferrous weld metal of good electrical conductivity.

13. A welded rail joint comprising two steel rails disposed end-to-end in alignment, each rail having a head, a web, and a base, a portion of the opposing end faces of the heads being vertically disposed, forwardly and downwardly inclined bevels extending between the top surfaces of the heads and said vertical face portions, the end faces of the heads presenting downwardly and forwardly inclined concave surfaces, the concavities on the adjacent rail ends being opposite each other one side of the webs being provided with forwardly and inwardly inclined bevels, the forward margins of the bevel on said webs joining with the inner margins of the concave surfaces, a base plate underlying the two bases and joined to said bases by deposited ferrous weld metal, at least a portion of the joint above said base plate comprising deposited nonferrous weld metal of good electrical conductivity.

PERSHING M. COOPER.

REFERENCES CITED

The following references are of record in the file of this patent:

UNITED STATES PATENTS

| Number | Name | Date |
|---|---|---|
| 1,907,979 | Katona | May 9, 1933 |
| 2,209,290 | Watts | July 23, 1940 |
| 2,228,087 | Rose | Jan. 7, 1941 |
| 2,238,836 | Vasarhelyi et al. | Apr. 15, 1941 |
| 2,249,723 | Orr, Jr. | July 15, 1941 |
| 2,276,782 | Jones | Mar. 17, 1942 |

FOREIGN PATENTS

| Number | Country | Date |
|---|---|---|
| 27,897 | Great Britain | Nov. 30, 1909 |
| 323,319 | Italy | Dec. 17, 1934 |